United States Patent
Kight

(10) Patent No.: US 8,418,651 B1
(45) Date of Patent: Apr. 16, 2013

(54) FEEDER SYSTEM

(76) Inventor: Samuel L. Kight, Orlando, FL (US)

( * ) Notice: Subject to any disclaimer, the term of this patent is extended or adjusted under 35 U.S.C. 154(b) by 0 days.

(21) Appl. No.: 12/932,743

(22) Filed: Mar. 4, 2011

(51) Int. Cl.
*A01K 5/00* (2006.01)

(52) U.S. Cl.
USPC .................................................. 119/52.1

(58) Field of Classification Search ............ 119/51.01, 119/52.1, 52.4, 53, 61.1, 61.3, 63, 61.53, 119/57.9; 403/403
See application file for complete search history.

(56) References Cited

U.S. PATENT DOCUMENTS

| | | | | |
|---|---|---|---|---|
| 489,589 A | * | 1/1893 | Lewis | 119/53 |
| 2,673,551 A | * | 3/1954 | McAnly | 119/54 |
| 2,691,361 A | * | 10/1954 | McAnly | 119/54 |
| 2,744,497 A | * | 5/1956 | Fisher et al. | 119/53 |
| 2,749,881 A | * | 6/1956 | Gustafson | 119/52.4 |
| 2,988,047 A | * | 6/1961 | Hurdle | 119/52.4 |
| 3,301,217 A | * | 1/1967 | Prowinsky | 119/57.9 |
| 3,951,107 A | * | 4/1976 | Doty | 119/52.4 |

FOREIGN PATENT DOCUMENTS

| | | | |
|---|---|---|---|
| GB | 2124881 A | * | 2/1984 |
| GB | 2162038 A | * | 1/1986 |
| GB | 2192776 A | * | 1/1988 |

* cited by examiner

*Primary Examiner* — Rob Swiatek

(57) ABSTRACT

A trough has a vertically disposed open front and a parallel rear panel and a horizontally disposed bottom panel. A front edge is located beneath the open front. The trough has an angled panel between the rear panel the bottom panel. Vertically disposed side panels create a chamber there between with a horizontally disposed rectangular open top. A vertically disposed divider panel is located within the chamber. The divider panel is parallel with and spaced between the open front and rear panel. In this manner a major chamber is formed rearwardly and a minor chamber forwardly. A passageway is formed between the divider panel and the bottom panel. In this manner food in the major chamber will move to the minor chamber upon depletion of food from the minor chamber.

1 Claim, 4 Drawing Sheets

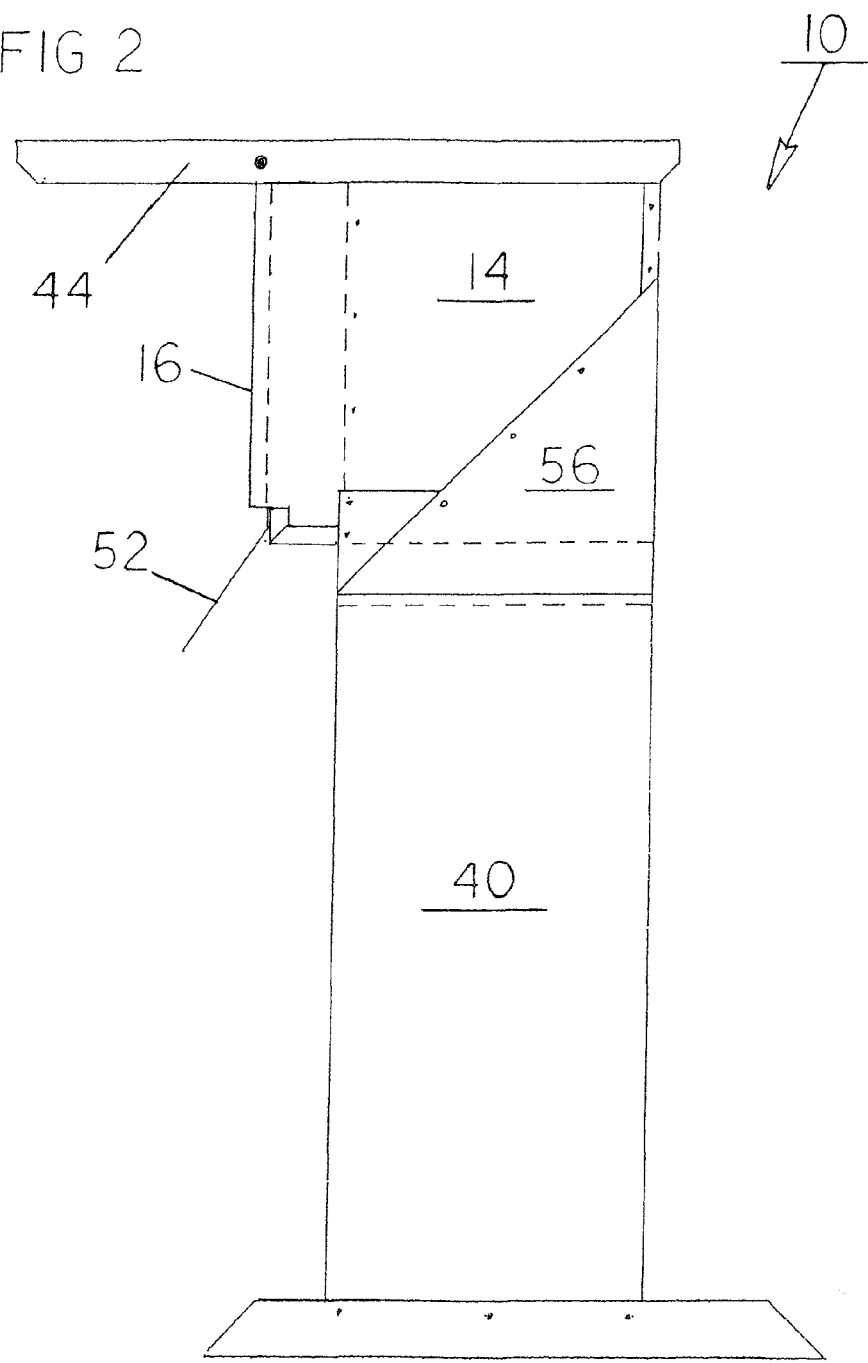

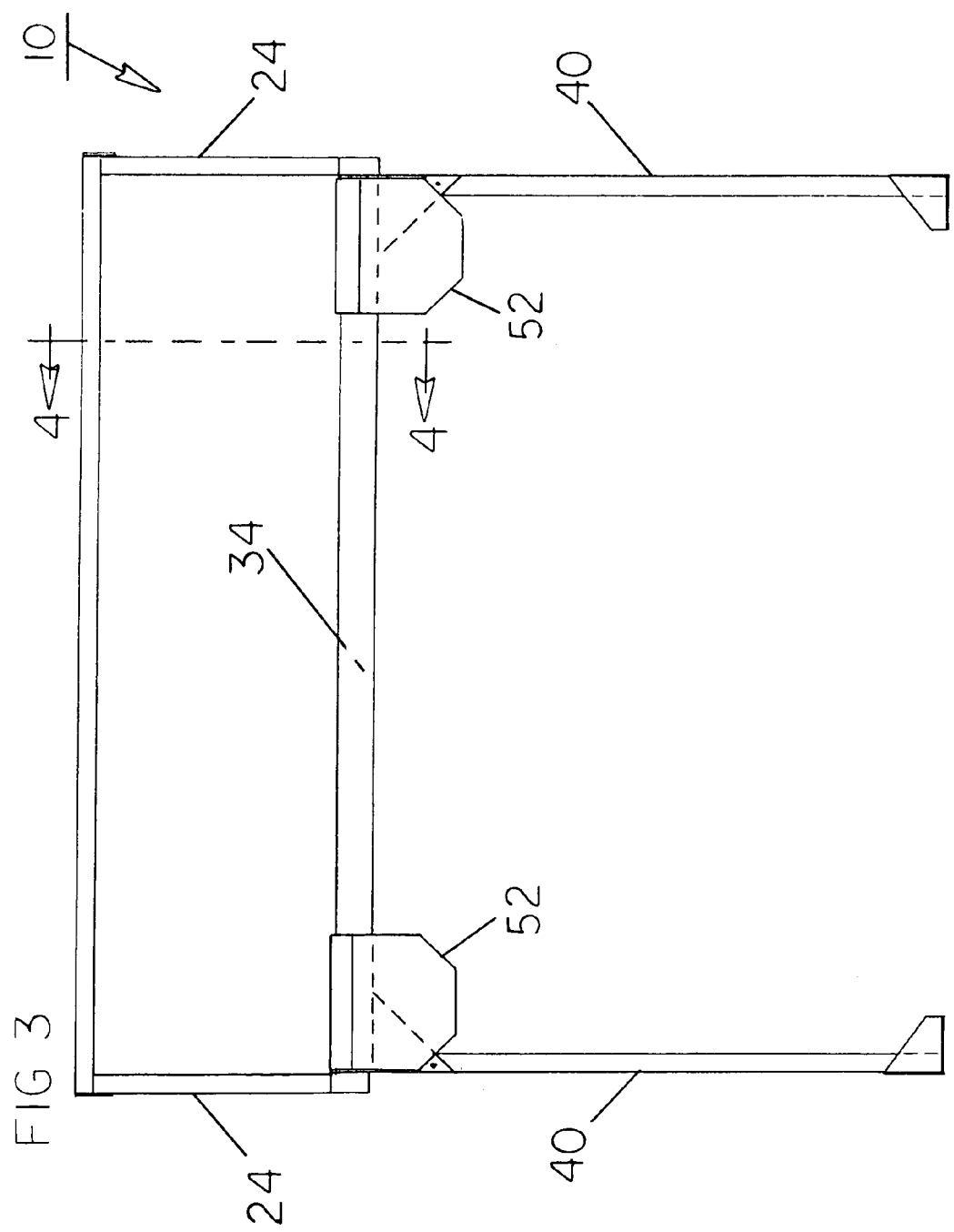

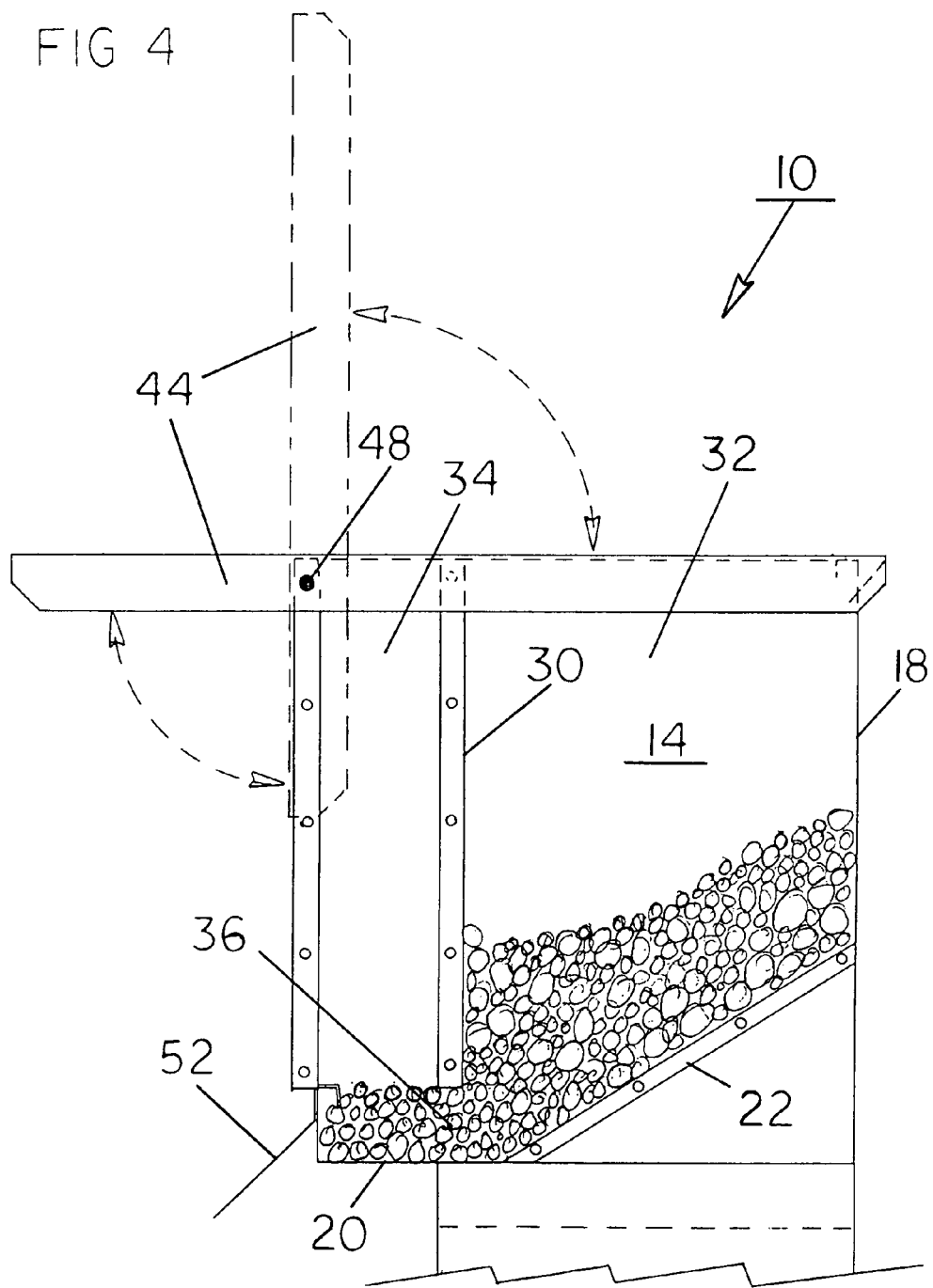

FEEDER SYSTEM

BACKGROUND OF THE INVENTION

Field of the Invention

The present invention relates to a feeder system and more particularly pertains to receiving and supporting a quantity of dry particulate food for being eaten by deer, the system adapted for covering and uncovering the food at the discretion of a user, the receiving, supporting, covering and uncovering being done in a safe, convenient and economical manner.

SUMMARY OF THE INVENTION

In view of the foregoing disadvantages inherent in the known types of feeders now present in the prior art, the present invention provides an improved feeder system. As such, the general purpose of the present invention, which will be described subsequently in greater detail, is to provide a new and improved feeder system and method which has all the advantages of the prior art and none of the disadvantages.

To attain this, the invention essentially comprises a feeder system. First provided is a trough. The trough has a vertically disposed open front. The trough has a parallel rear panel. The open front and rear panels have upper edges at a common elevation. The open front and rear panels have lower edges. The lower edge of the front panel is at an elevation lower than the lower edge of the rear panel. The trough has a horizontally disposed bottom panel. The bottom panel has a front edge and a rear edge. The front edge is located beneath the open front. The trough has an angled panel. The angled panel has a rear edge. The rear edge is formed as an extension of the lower edge of the rear panel. The angled panel has a front edge. The front edge is attached to the rear edge of the bottom panel. The rear and bottom and angled panels have laterally spaced side edges. The trough has vertically disposed side panels. The side edges are attached to the side panels. In this manner a chamber is created between the side panels. The chamber has a horizontally disposed rectangular open top.

A vertically disposed divider panel is provided. The divider panel is located within the chamber. The divider panel is parallel with and spaced between the open front and rear panel closer to the open front than to the rear panel. In this manner a major chamber is formed rearwardly. Also in this manner a minor chamber is formed forwardly. A passageway is formed between the divider panel and the bottom panel. In this manner food in the major chamber will move to the minor chamber upon depletion of food from the minor chamber as caused by deer eating food from the minor chamber.

Legs are provided next. The legs extend downwardly as extensions of the side panels. In this manner the trough is supported at an elevation for presenting food for being eaten by deer.

Provided next is a lid. The lid is in a rectangular configuration. The lid has depending side flanges. Pivot pins are provided. The pivot pins extend through the side flanges and the side panels. In this manner the lid may be rotated between a closed horizontal orientation and an open vertical orientation. In the closed horizontal orientation the lid covers the open top of the chamber. In the open vertical orientation filling of the major chamber with food is allowed.

Further provided are critter guards. The critter guards extend downwardly from the front edge of the lower panel adjacent to the legs. In this manner small animals are precluded from crawling up the legs and entering the chamber and eating the food.

Provided last are two similarly configured diamond shaped strengtheners. Each strengthener covers portions of a leg and a side panel and the rear panel.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved feeder system which has all of the advantages of the prior art feeder systems of known designs and configurations and none of the disadvantages.

It is another object of the present invention to provide a new and improved feeder system which may be easily and efficiently manufactured and marketed.

It is further object of the present invention to provide a new and improved feeder system which is of durable and reliable constructions.

An even further object of the present invention is to provide a new and improved feeder system which is susceptible of a low cost of manufacture with regard to both materials and labor, and which accordingly is then susceptible of low prices of sale to the consuming public, thereby making such feeder system economically available to the buying public.

Even still another object of the present invention is to provide a feeder system for receiving and supporting a quantity of dry particulate food for being eaten by deer, the system adapted for covering and uncovering the food at the discretion of a user, the receiving, supporting, covering and uncovering being done in a safe, convenient and economical manner.

Lastly, it is an object of the present invention to provide a new and improved feeder system. A trough has a vertically disposed open front and a parallel rear panel and a horizontally disposed bottom panel. A front edge is located beneath the open front. The trough has an angled panel between the rear panel the bottom panel. Vertically disposed side panels create a chamber there between with a horizontally disposed rectangular open top. A vertically disposed divider panel is located within the chamber. The divider panel is parallel with and spaced between the open front and rear panel. In this manner a major chamber is formed rearwardly and a minor chamber forwardly. A passageway is formed between the divider panel and the bottom panel. In this manner food in the major chamber will move to the minor chamber upon depletion of food from the minor chamber.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the system shown in FIG. 1.

FIG. 3 is a front elevational view of the system shown in FIGS. 1 and 2.

FIG. 4 is a cross sectional view taken along line 4-4 of FIG. 3.

The same reference numerals refer to the same parts throughout the various Figures.

DESCRIPTION OF THE PREFERRED EMBODIMENT

Figure 1:
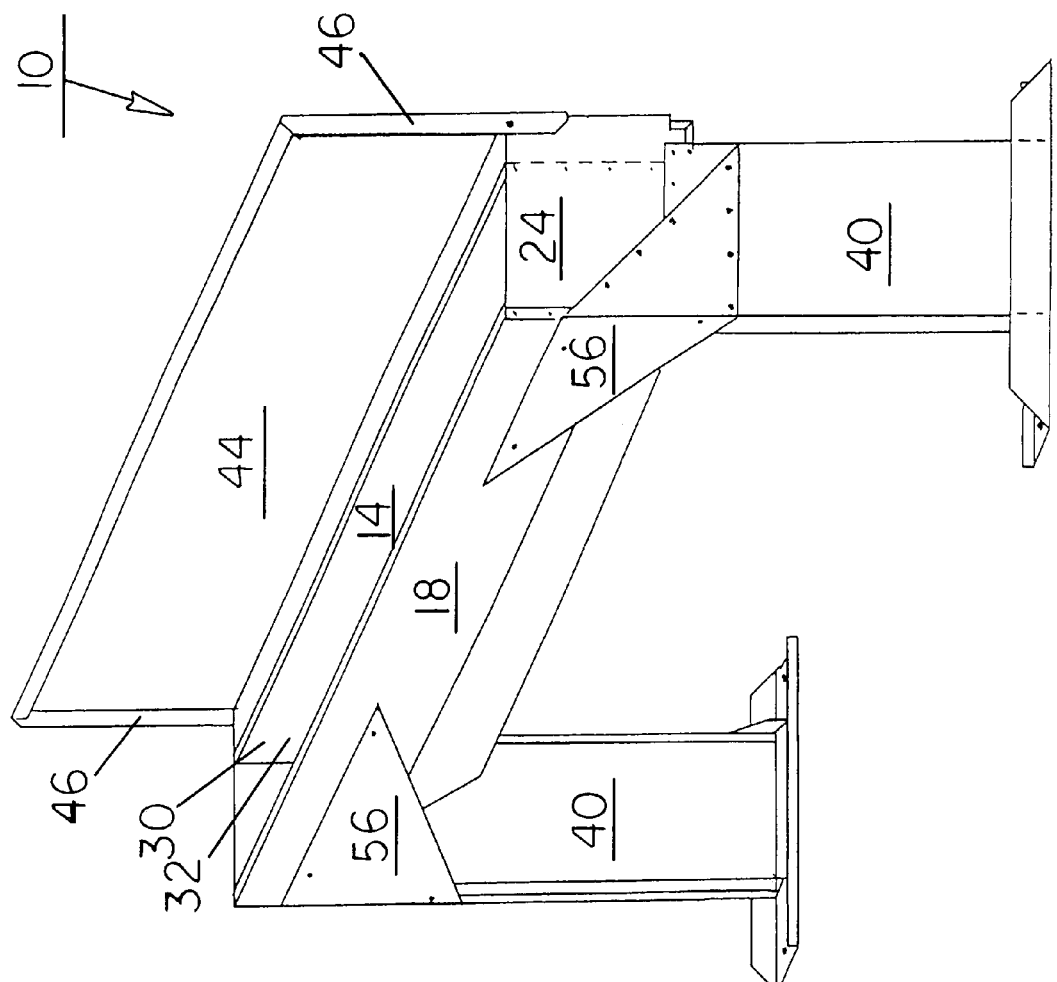
FIG. 1 is a rear perspective illustration of a deer feeder system constructed in accordance with the principles of the present invention.

With reference now to the drawings, and in particular to FIG. 1 thereof, the preferred embodiment of the new and improved feeder system embodying the principles and concepts of the present invention and generally designated by the reference numeral 10 will be described.

The present invention, the feeder system 10 is comprised of a plurality of components. Such components in their broadest context include a trough and a vertically disposed divider panel. Such components are individually configured and correlated with respect to each other so as to attain the desired objective.

First provided is a trough 14. The trough has a vertically disposed open front 16. The trough has a parallel rear panel 18. The open front and rear panels have upper edges at a common elevation. The open front and rear panels have lower edges. The lower edge of the front panel is at an elevation lower than the lower edge of the rear panel. The trough has a horizontally disposed bottom panel 20. The bottom panel has a front edge and a rear edge. The front edge is located beneath the open front. The trough has an angled panel 22. The angled panel has a rear edge. The rear edge is formed as an extension of the lower edge of the rear panel. The angled panel has a front edge. The front edge is attached to the rear edge of the bottom panel. The rear and bottom and angled panels have laterally spaced side edges. The trough has vertically disposed side panels 24. The side edges are attached to the side panels. In this manner a chamber 26 is created between the side panels. The chamber has a horizontally disposed rectangular open top.

A vertically disposed divider panel 30 is provided. The divider panel is located within the chamber. The divider panel is parallel with and spaced between the open front and rear panel closer to the open front than to the rear panel. In this manner a major chamber 32 is formed rearwardly. Also in this manner a minor chamber 34 is formed forwardly. A passageway 36 is formed between the divider panel and the bottom panel. In this manner food in the major chamber will move to the minor chamber upon depletion of food from the minor chamber as caused by deer eating food from the minor chamber.

Legs 40 are provided next. The legs extend downwardly as extensions of the side panels. In this manner the trough is supported at an elevation for presenting food for being eaten by deer.

Provided next is a lid 44. The lid is in a rectangular configuration. The lid has depending side flanges 46. Pivot pins 48 are provided. The pivot pins extend through the side flanges and the side panels. In this manner the lid may be rotated between a closed horizontal orientation and an open vertical orientation. In the closed horizontal orientation the lid covers the open top of the chamber. In the open vertical orientation filling of the major chamber with food is allowed.

Further provided are critter guards 52. The critter guards extend downwardly from the front edge of the lower panel adjacent to the legs. In this manner small animals are precluded from crawling up the legs and entering the chamber and eating the food.

Provided last are two similarly configured diamond shaped strengtheners 56. Each strengthener covers portions of a leg and a side panel and the rear panel. The entire system of the primary embodiment is fabricated of a rigid metallic sheet metal, preferably galvanized steel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A deer feeder system (10) for receiving and supporting a quantity of dry particulate food for being eaten by deer, the system adapted for covering and uncovering the food at the discretion of a user, the receiving, supporting, covering and uncovering being done in a safe, convenient and economical manner, the system comprising in combination:

a trough (14) having a vertically disposed open front (16) and having a parallel rear panel (18), the open front and rear panel having upper edges at a common elevation, the open front and the rear panel having lower edges with the lower edge of the front being at an elevation lower than the lower edge of the rear panel, the trough having a horizontally disposed bottom panel (20) with a front edge and a rear edge, the front edge being located beneath the open front, the trough having an angled panel (22) with a rear edge formed as an extension of the lower edge of the rear panel and a front edge attached to the rear edge of the bottom panel, the rear and bottom and angled panels having laterally spaced side edges, vertically disposed side panels (24) with the side edges attached to the side panels to create a chamber (26)

between the side panels, the chamber having a horizontally disposed rectangular open top;

a vertically disposed divider panel (30) located within the chamber, the divider panel being parallel with and spaced between the open front and rear panel closer to the open front than to the rear panel thereby forming a major chamber (32) rearwardly of the divider panel with the angled panel (22) beneath the major chamber and a minor chamber (34) forwardly of the divider panel with the horizontally disposed bottom panel (20) beneath the divider panel, a passageway (36) formed between the divider panel and the bottom panel whereby food in the major chamber will move to the minor chamber upon depletion of food from the minor chamber as caused by deer eating food from the minor chamber;

legs (40) extending downwardly as extensions of the side panels for supporting the trough at an elevation for presenting food for being eaten by deer;

a lid (44) in a rectangular configuration with depending side flanges (46), pivot pins (48) extending through the side flanges and the side panels for rotating the lid between a closed horizontal orientation covering the open top of the chamber, including said major and minor chambers, and an open vertical orientation allowing the filling of the major chamber with food;

critter guards (52) extending downwardly from the front edge of the lower panel adjacent to the legs to preclude small animals from crawling up the legs and entering the chamber and eating food; and two similarly configured diamond shaped strengtheners (56), each strengthener covering portions of a leg and a side panel and the rear panel.

\* \* \* \* \*